(12) United States Patent
Cheong et al.

(10) Patent No.: US 10,197,763 B2
(45) Date of Patent: Feb. 5, 2019

(54) ACTUATOR DRIVING APPARATUS, CAMERA MODULE, AND ELECTRONIC APPARATUS

(71) Applicant: Samsung Electro-Mechanics Co., Ltd., Suwon-si (KR)

(72) Inventors: Shin Young Cheong, Suwon-si (KR); Hoon Heo, Suwon-si (KR); Ho Jun Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 86 days.

(21) Appl. No.: 15/145,197

(22) Filed: May 3, 2016

(65) Prior Publication Data

US 2016/0353004 A1    Dec. 1, 2016

(30) Foreign Application Priority Data

May 28, 2015    (KR) .......................... 10-2015-0074557

(51) Int. Cl.
*G02B 7/09* (2006.01)
*H04N 5/225* (2006.01)
(Continued)

(52) U.S. Cl.
CPC .................. *G02B 7/09* (2013.01); *G03B 3/10* (2013.01); *H04N 5/2253* (2013.01);
(Continued)

(58) Field of Classification Search
CPC .. H04N 5/2253; H04N 5/2254; H04N 5/2257; H04N 5/23203; G03B 3/10; G02B 7/09
See application file for complete search history.

(56) References Cited

U.S. PATENT DOCUMENTS

2006/0256209 A1    11/2006 Yoshida et al.
2010/0182490 A1*   7/2010 Seol ..................... H04N 5/2254
                                                                  348/345
(Continued)

FOREIGN PATENT DOCUMENTS

CN       102472944 A     5/2012
JP       2001-209950 A   8/2001
(Continued)

OTHER PUBLICATIONS

Korean Office Action dated Jul. 8, 2016 in counterpart Korean Application No. 10-2015-0074557 (7 pages in English; 6 pages in Korean).
Chinese Office Action dated Apr. 26, 2018 in Corresponding Chinese Patent Application No. 201610365814.4 (19 pages in English, 12 pages in Chinese).

*Primary Examiner* — Nhan T Tran
(74) *Attorney, Agent, or Firm* — NSIP Law

(57) ABSTRACT

There are provided an actuator driving apparatus, a camera module, and an electronic apparatus to selectively use a position and current control method and a current control method. The actuator driving apparatus includes a position controller and a current driver. The position controller is configured to receive a control input signal and output the control input signal or a position control signal, which is generated based on the control input signal, according to a mode signal. The current driver is configured to generate a current to drive an actuator according to the control input signal or the position control signal.

43 Claims, 18 Drawing Sheets

(51) Int. Cl.
*G03B 3/10* (2006.01)
*H04N 5/232* (2006.01)

(52) U.S. Cl.
CPC ......... *H04N 5/2254* (2013.01); *H04N 5/2257* (2013.01); *H04N 5/23203* (2013.01); *G03B 2205/0053* (2013.01)

(56) References Cited

U.S. PATENT DOCUMENTS

| | | |
|---|---|---|
| 2011/0141584 A1 | 6/2011 | Henderson et al. |
| 2012/0154614 A1 | 6/2012 | Moriya et al. |
| 2013/0293179 A1* | 11/2013 | Lee ................... H02P 25/034 318/647 |
| 2014/0268361 A1* | 9/2014 | Nunnink ................ G02B 7/08 359/665 |
| 2014/0327965 A1* | 11/2014 | Chen ................... G02B 7/08 359/557 |
| 2016/0295099 A1* | 10/2016 | Kasamatsu .......... H04N 5/2257 |

FOREIGN PATENT DOCUMENTS

| | | |
|---|---|---|
| JP | 2014-513911 A | 6/2014 |
| KR | 10-0880672 B1 | 2/2009 |
| KR | 10-2010-0058949 A | 6/2010 |
| KR | 10-2013-0124699 A | 11/2013 |
| WO | WO 2012/131344 A2 | 10/2012 |

* cited by examiner

ACTUATOR DRIVING APPARATUS, CAMERA MODULE, AND ELECTRONIC APPARATUS

CROSS-REFERENCE TO RELATED APPLICATION

This application claims the priority and benefit under 35 USC 119(a) of Korean Patent Application No. 10-2015-0074557 filed on May 28, 2015, with the Korean Intellectual Property Office, the disclosure of which is incorporated herein by reference.

BACKGROUND

1. Field

The following description relates to an actuator driving apparatus, a camera module, and an electronic apparatus.

2. Description of Related Art

Recently, in addition to transmitting text or voice data between electronic devices, image data is also being transmitted using general portable communications terminals such as mobile phones, personal digital assistants (PDAs), portable computers, and other similar types of portable communications terminals or electronic devices. Therefore, in order to perform image data transmission, allow for image chatting, or other communications that may involve image data transmission, a camera module is typically installed in the portable communications terminals.

In general, such a camera module includes a lens barrel including a lens therein, a housing accommodating the lens barrel, and an image sensor converting a captured image of a subject into an electrical signal. In addition, a single focus type camera module, which images the subject at a fixed focus, may be used as the camera module, but with recent technological developments, a camera module including an actuator to control autofocusing has been used.

In order to drive the actuator, an actuator driving apparatus is used, in which it is difficult to accurately detect non-linearity characteristics of the actuator, even when a same current is input, thus, linearity characteristics of the actuator may be deteriorated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an actuator driving apparatus, including: a position controller configured to receive a control input signal and output the control input signal or a position control signal, which is generated based on the control input signal, according to a mode signal; and a current driver configured to generate a current to drive an actuator according to the control input signal or the position control signal.

The position controller may include: a switch configured to convert a signal transfer path of the control input signal according to the mode signal; a position error calculator calculating an error between the control input signal transferred from the switch and a detection signal; a proportional-integral-derivative (PID) controller configured to perform proportional, integral, or derivative control on the error and output a control result indicative thereof; and a filter configured to filter the control result.

The position controller may include: a position error calculator configured to turn-off an operation to output the control input signal or calculate a position error between the control input signal and a detection signal according to the mode signal; a proportional-integral-derivative (PID) controller configured to perform proportional, integral, or derivative control on the position error, turn derivative and integral control operations off according to the mode signal, and set a gain of the proportional control to output the control input signal from the position error calculator; and a filter configured to filter a control result from the PID controller or output the control input signal from the PID controller.

The current driver may include: a current controller configured to output the current driving the actuator according to the control input signal or the position control signal from the position controller; and a current sensor configured to detect the current transferred to the actuator.

The actuator driving apparatus may also include: a driver configured to receive the current from the current driver to drive the actuator.

The actuator driving apparatus may also include a hall sensor configured to detect a position of the actuator; and an amplifier configured to amplify a level of a detection signal from the hall sensor.

In response to the position controller outputting the control input signal, the position controller may open a feedback loop through which the detection signal is transferred from the hall sensor, or set an amplification rate of the amplifier to zero.

The position controller may operate according to a first clock signal, and the current driver may operate according to a second clock signal having a different clock period to a clock period of the first clock signal.

The second clock signal may have a sampling rate higher than a sampling rate of the first clock signal.

In accordance with an embodiment, there is provided an actuator driving apparatus, including: a position controller configured to generate a position control signal based on a control input signal; a current driver configured to output a current to drive an actuator according to the position control signal from the position controller or the control input signal; and a selection providing unit configured to transfer the control input signal to the position controller or the current driver according to a mode signal.

The current driver may include: a current controller configured to output the current driving the actuator according to the control input signal or the position control signal; and a current sensor configured to detect the current transferred to the actuator.

The actuator driving apparatus may also include a driver configured to receive the current from the current driver to drive the actuator.

The actuator driving apparatus may also include a hall sensor configured to detect a position of the actuator; and an amplifier configured to amplify a level of a detection signal from the hall sensor.

In response to the control input signal being transferred to the current driver according to the mode signal, the position controller may open a feedback loop through which the detection signal is transferred from the hall sensor, or set an amplification rate of the amplifier to zero.

The position controller may operate according to a first clock signal, and the current driver may operate according to a second clock signal having a different clock period to a clock period of the first clock signal.

The second clock signal may have a sampling rate higher than a sampling rate of the first clock signal.

In accordance with another embodiment, there is provided a camera module, including: an actuator configured to move a lens carrier; and an actuator driving apparatus configured to output a current to drive the actuator, wherein the actuator driving apparatus generates the current according to the control input signal or a position control signal, which is generated based on a control input signal.

The actuator driving apparatus may include: a position controller configured to output a received control input signal or generate a position control signal based on the control input signal according to a mode signal; a current driver configured to output the current driving the actuator according to the control input signal output from the position controller or the position control signal from the position controller; a driver configured to receive the current from the current driver to drive the actuator; a hall sensor configured to detect a position of the actuator; and an amplifier configured to amplify a level of a detection signal from the hall sensor.

The actuator driving apparatus may include: a position controller configured to generate the position control signal based on the control input signal; a current driver configured to output the current driving the actuator according to the position control signal from the position controller or the control input signal; a selection providing unit configured to transfer the control input signal to the position controller or the current driver according to a mode signal; a driver configured to receive the current from the current driver to drive the actuator; a hall sensor configured to detect a position of the actuator; and an amplifier configured to amplify a level of a detection signal from the hall sensor.

The position controller may include: a switch configured to convert a signal transfer path of the control input signal according to the mode signal; a position error calculator configured to calculate an error between the control input signal transferred from the switch and a detection signal; a proportional-integral-derivative (PID) controller configured to perform proportional, integral, or derivative control on the error and output a control result indicative thereof; and a filter configured to filter the control result.

The position controller may include: a position error calculator configured to turn-off an operation to output the control input signal or calculate a position error between the control input signal and a detection signal according to a mode signal;

a proportional-integral-derivative (PID) controller configured to perform proportional, integral, or derivative controlling on information calculated by the position error calculator, turn derivative and integral control operations off according to the mode signal, and set a gain of the proportional control to output the control input signal output from the position error calculator; and a filter configured to filter a control result from the PID controller or output the control input signal from the PID controller.

The position controller may include: a position error calculator configured to calculate an error between the transferred control input signal and a detection signal; a proportional-integral-derivative (PID) controller configured to perform proportional, integral, or derivative control on the error and output a control result indicative thereof; and a filter configured to filter the control result.

The actuator may include: a coil configured to generate a magnetic field depending on the current; and a magnetic body configured to interact with the magnetic field of the coil to generate driving force moving the lens carrier.

The camera module may also include: a magnetic detection body configured to detect an intensity of the magnetic field, wherein the magnetic detection body may include first and second magnetic bodies, which are polarized.

The camera module may also include: a board on which the actuator driving apparatus is mounted, wherein the actuator may include: a coil disposed on the board to generate a magnetic field based on the current; and a magnetic body disposed to face the coil and configured to interact with the current of the coil to generate a driving force to move the lens carrier.

The camera module may also include: a ball bearing configured to support movement of the lens carrier, wherein a lubricant is applied to a surface of the ball bearing.

The actuator further may include a yoke closely connecting the first magnetic body and the actuator driving apparatus to each other.

The coil is disposed outside of the lens carrier, and magnetic bodies are disposed in accordance with a disposition of the coil.

The camera module may also include: an elastic member configured to be disposed on at least one of upper and lower portions of the lens carrier to support movement of the lens carrier.

The lens carrier may include a lens barrel having at least one lens attached by one of an adhesive method and a screw-coupling method.

The camera module may also include: an image sensor module configured to process an image signal captured through a lens of the lens carrier.

In accordance with an embodiment, there is provided an electronic apparatus, including: a camera module configured to process an image signal captured through a lens and including an actuator driving apparatus outputting a current driving an actuator moving a lens carrier having the lens according to a control input signal or a position control signal generated based on the control input signal; and a display part configured to display the image captured by the camera module.

The actuator driving apparatus may include: a position controller configured to output a control input signal or generate the position control signal, which is based on the control input signal, according to a mode signal; and a current driver configured to output the current driving the actuator according to the control input signal or the position control signal; a driver configured to receive the current from the current driver to drive the actuator; a hall sensor configured to detect a position of the actuator; and an amplifier configured to amplify a level of a detection signal from the hall sensor.

The actuator driving apparatus may include: a position controller configured to generate the position control signal based on the control input signal; a current driver configured to output the current driving the actuator according to the position control signal or the control input signal; a selection providing unit configured to transfer the control input signal to the position controller or the current driver according to a mode signal; a driver configured to receive the current from the current driver to drive the actuator; a hall sensor configured to detect a position of the actuator; and an amplifier configured to amplify a level of a detection signal from the hall sensor.

The position controller may include: a switch configured to convert a signal transfer path of the control input signal according to the mode signal; a position error calculator configured to calculate an error between the control input signal transferred from the switch and a detection signal; a proportional-integral-derivative (PID) controller configured to perform proportional, integral, or derivative control on the error and output a control result indicative thereof; and a filter configured to filter the control result.

The position controller may include: a position error calculator turning off an operation to output the control input signal or calculating a position error between the control input signal and a detection signal according to a mode signal; a proportional-integral-derivative (PID) controller performing proportional, integral, or derivative controlling on information calculated by the position error calculator, turning derivative and integral control operations off according to the mode signal, and setting a gain of the proportional control to output the control input signal output from the position error calculator; and a filter configured to filter a control result from the PID controller or output the control input signal from the PID controller.

The position controller may include: a position error calculator configured to calculate an error between the transferred control input signal and a detection signal; a proportional-integral-derivative (PID) controller configured to perform proportional, integral, or derivative control on the error and output a control result indicative thereof; and a filter configured to filter the control result.

In accordance with an embodiment, there is provided an actuator driving apparatus, including: a position controller configured to receive a control input signal to operate in a current control mode or to generate a position control signal based on the control input signal to operate in a position control mode; a current controller configured to generate a current to drive an actuator based on the control input signal or based on the position control signal; and a sensor configured to, in the position control mode, detect a position of the actuator, generate a detection signal indicative of the position of the actuator, and transmit the detection signal to the position controller, wherein the position controller is configured to calculate an error between position information included in the control input signal and position information included in the detection signal, and configured to process the control input signal based on the error to control the position of the actuator.

The actuator driving apparatus may also include: a current sensor configured to convert the current transferred to the actuator into a voltage and feedback the voltage to the current controller.

The actuator driving apparatus may also include: an amplifier configured to amplify the detection signal, wherein the position controller controls an amplification rate of the amplifier.

The position controller may process the control input signal through a proportional, integral, or derivative control on the control input signal based on the error to generate position control information.

The position controller may operate according to a first clock signal, and the current controller operates according to a second clock signal, and an operation interval of the second clock signal may be different from an operation interval of the first clock signal.

The position controller may include a switch to select a signal transfer path based on the current control mode or the position control mode.

The position controller may include a proportional, integral, and derivative (PID) controller to select the signal transfer path and process the control input signal through a proportional, integral, or derivative control on the control input signal based on the error to generate position control information.

The actuator driving apparatus may also include: a memory configured to store detection information included in a detection signal of the sensor, store information to drive the actuator based on a control from the position controller or the current controller, and provide the stored information to either the position controller or the current controller.

In accordance with another embodiment, there is provided a method to drive an actuator driving apparatus, including: receiving a control input signal to operate in a current control mode or to generate a position control signal based on the control input signal to operate in a position control mode; generating a current to drive an actuator based on the control input signal in the current control mode or based on the position control signal in the position control mode; in the position control mode, detecting a position of the actuator; generating a detection signal indicative of the position of the actuator; transmitting the detection signal to the position controller; calculating an error between position information included in the control input signal and position information included in the detection signal; and processing the control input signal based on the error to control the position of the actuator.

The method may also include converting the current transferred to the actuator into a voltage; and feedback the voltage to the current controller.

The method may also include amplifying the detection signal at a controlled amplification rate.

The control input signal is processed through a proportional, integral, or derivative control on the control input signal based on the error to generate position control information.

The method may also include storing detection information included in a detection signal of the sensor; storing information to drive the actuator based on a control from the position controller or the current controller; and providing the stored information to either the position controller or the current controller.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which.

Figure 1:
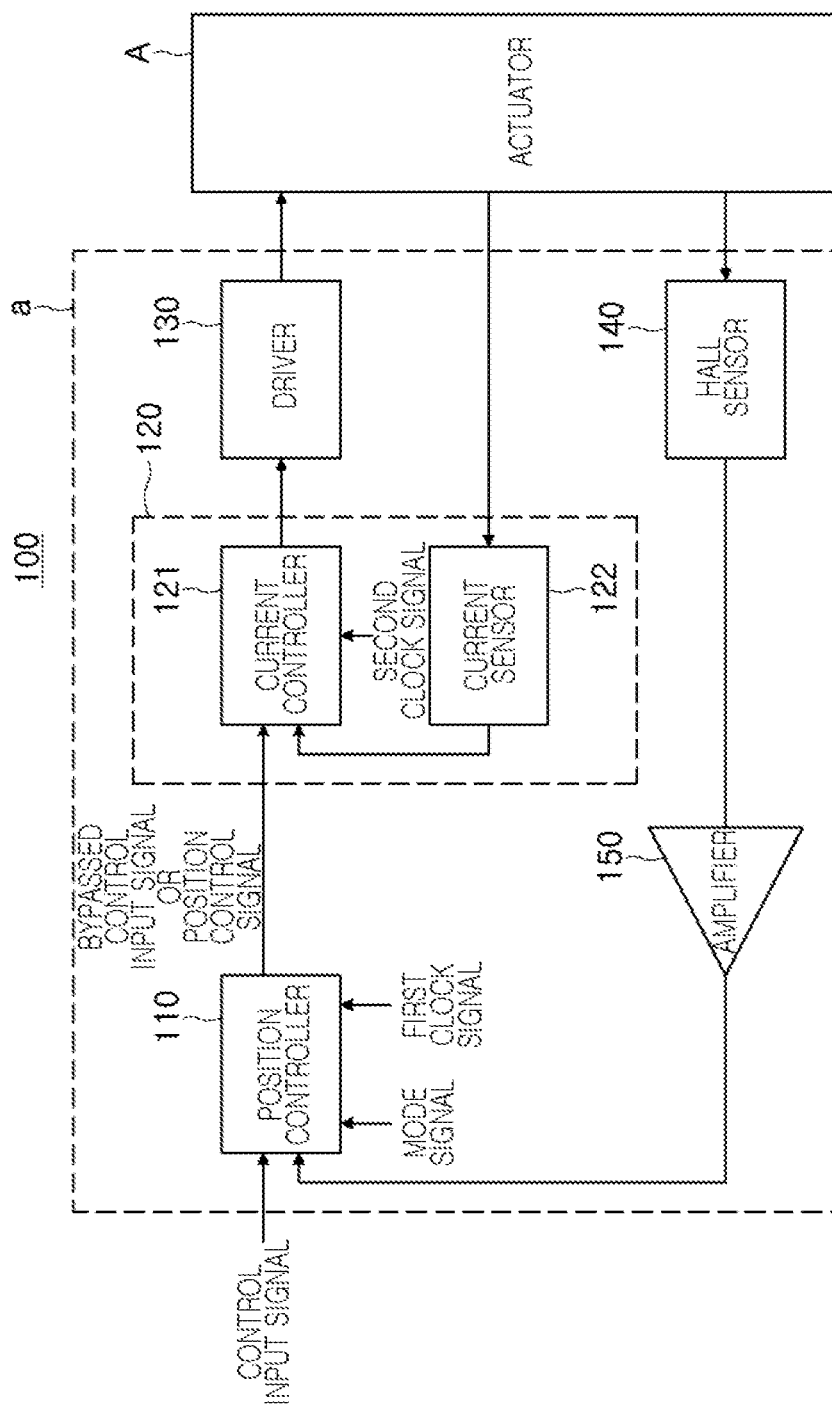
FIG. 1 is a schematic block diagram of an actuator driving apparatus, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating various embodiments. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be constituted by one or a combination thereof.

FIG. 1 is a schematic block diagram of an actuator driving apparatus, according to an embodiment.

Referring to FIG. 1, an actuator driving apparatus 100, according to an embodiment includes a position controller 110 and a current driver 120, a driver 130, a hall sensor 140, and an amplifier 150.

As illustrated by a dotted line (a), the position controller 110 and the current driver 120 may be configured as a single integrated circuit. Alternatively, the driver 130, the hall sensor 140, and the amplifier 150, in addition the position controller 110 and the current driver 120, may be configured as a single integrated circuit. In another embodiment, the position controller 110 and the current driver 120 may be separate structural elements, each including additional structural elements other than those illustrated in FIG. 1. Furthermore, although the actuator driving apparatus 100 of FIG. 1 includes the position controller 110, the current driver 120, the driver 130, the hall sensor 140, and the amplifier 150, a person of ordinary skill in the art will appreciate that additional structural elements may be included in the configuration of the actuator driving apparatus 100.

The position controller 110 receives a control input signal from an external source. In turn, the position controller 110 transmits the control input signal to the current driver 120, or generates a position control signal based on the control input signal and transmits the position control signal to the current driver 120.

The position controller 110 operates according to a first clock signal.

The current driver 120 includes a current controller 121 and a current sensor 122.

The current controller 121 generates a current driving an actuator A according to the position control signal or the output control input signal.

For example, the current controller 121 is a digital filter. In addition, for example, the current controller 121 is a proportional-integral-derivative (PID) controller.

The current driver 120, particularly, the current controller 121 operates according to a second clock signal, and a period or operation interval of the second clock signal may be different from that of the first clock signal.

For example, a sampling rate of the second clock signal is faster than that of the first clock signal, such as at least 10 times faster than that of the first clock signal.

In an example, the sampling rate is equal to a feedback loop refresh rate.

In addition, the first and second clock signals may have different operation periods, but may be synchronized with each other.

The current sensor 122 detects the current driving the actuator A to feedback the detected current to the current controller 121.

In one embodiment, the current sensor 122 includes a resistor to convert a current transferred to the actuator A into a voltage to feedback the converted voltage to the current controller 121. In an embodiment in which the actuator A includes a coil, the current sensor 122 detects a current flowing through the coil.

The driver 130 drives the actuator A depending on the current from the current controller 121.

The driver 130 is an H bridge driver configured to perform bidirectional driving.

The hall sensor 140 detects a position of the actuator A, and a detection signal is amplified through the amplifier 150 to be feedbacked to the position controller 110.

Figure 2A:
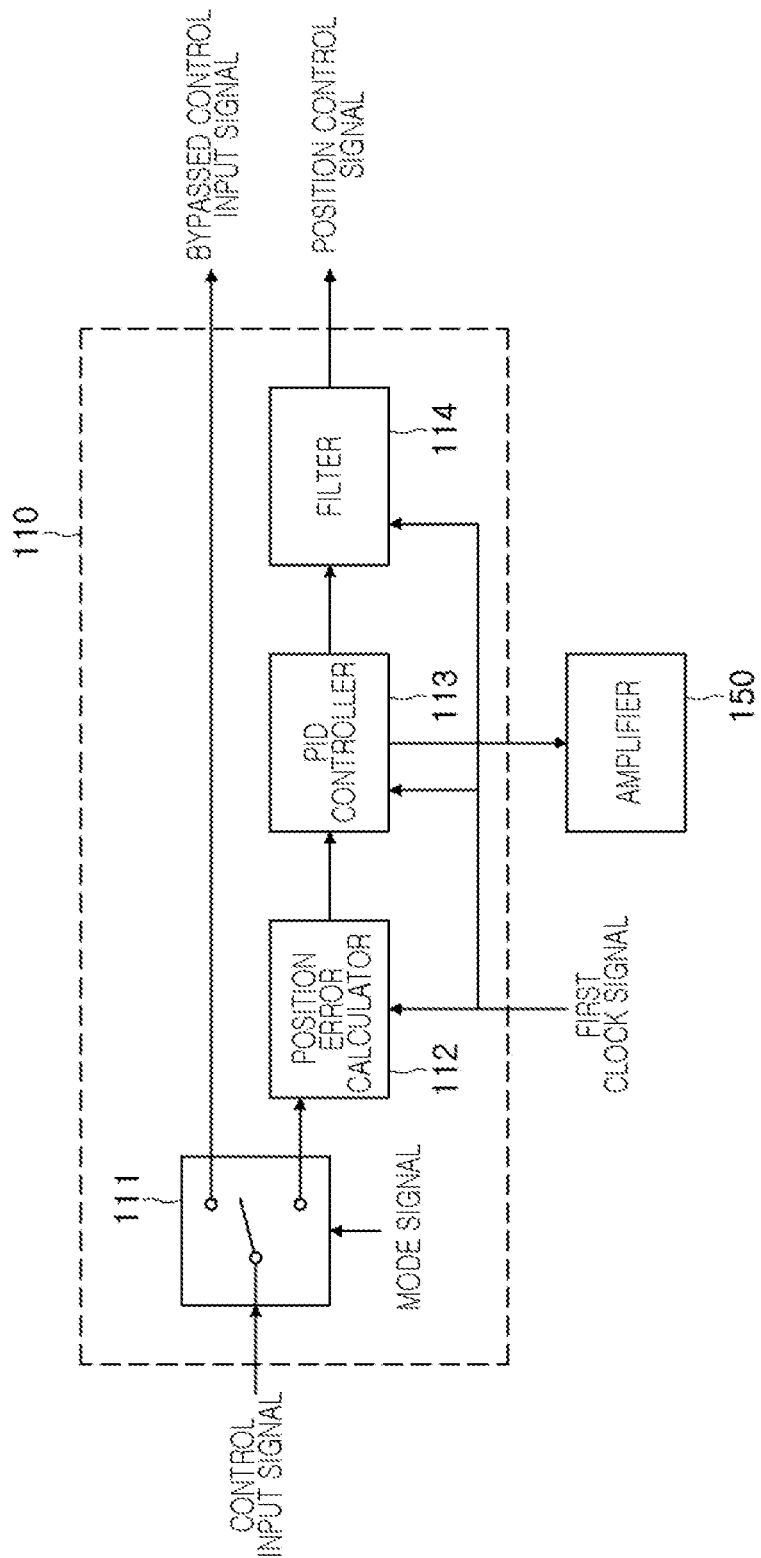
FIGS. 2A and 2B are block diagrams of examples of a position controller used in the actuator driving apparatus, according to the embodiment illustrated in FIG. 1.
Figure 2B:
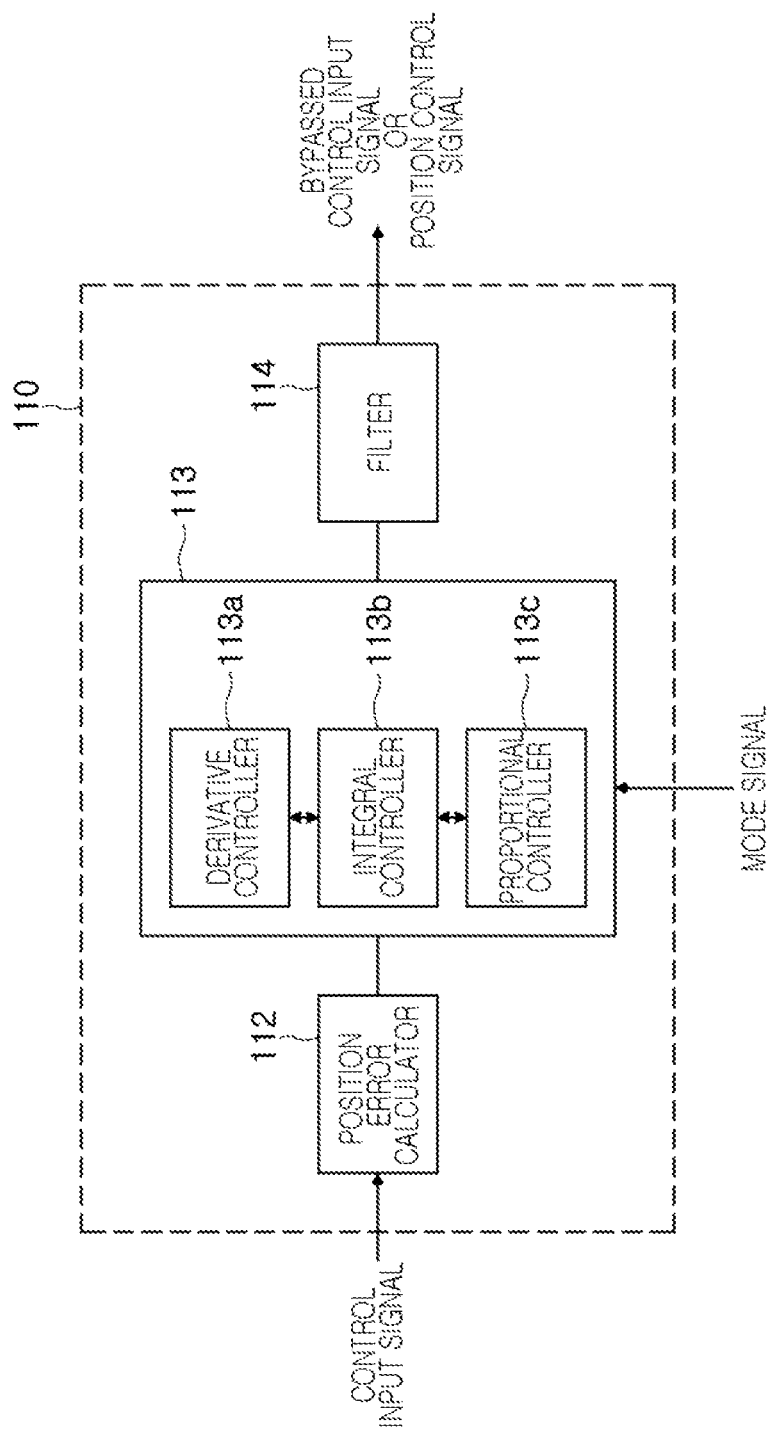

FIGS. 2A and 2B are block diagrams of examples of a position controller used in the actuator driving apparatus, according to the embodiment illustrated in FIG. 1.

Referring to FIG. 2A, the position controller 110 used in the actuator driving apparatus, according to the embodiment illustrated in FIG. 1, includes a switch 111, a position error calculator 112, a PID controller 113, and a filter 114.

Based on a mode signal, the switch 111 selects a transfer path of the control input signal to output the received control input signal to the current controller 121 or transfer the received control input signal to the position error calculator 112.

The position error calculator 112 calculates an error between position information included in the control input signal and position information included in the detection signal detected by the hall sensor 40. In one embodiment, at a first instance, the position information included in the control input signal is information about a desired position to drive a camera module and the position information detected by the hall sensor 40 the position information in the detection signal is information about an actual position of the camera module, which is sent to the amplifier 150 and fed back to the position controller 110.

The proportional-integral-derivative (PID) controller 113 performs proportional, integral, or derivative control on the control input signal according to or based on the calculated error to generate a signal including position control information, and the filter 114 filters the signal to output the position control signal.

Further, the PID controller 112 controls an amplification rate of the amplifier 150.

In addition, the first clock signal generates a reference clock to internal configurations or internal structural elements in the position controller 110. Once received, the position controller 110 divides the first clock signal to be provided to the internal configurations of the position controller 11.

Referring to FIG. 2B, a function of selecting a signal transfer path of the switch 111 of FIG. 2A may be replaced by the PID controller 113.

The PID controller 113 includes a derivative controller 113a, an integral controller 113b, and a proportional controller 113c.

In an embodiment in which the switch 111 of FIG. 2A is excluded or omitted and the PID controller 113 is instead used to select the signal transfer path, the position error calculator 112 is configured to turn-off an operation according to the mode signal and output the received control input signal. In turn, the derivative controller 113a and the integral controller 113b are turned-off according to the mode signal, and the proportional controller 113c is set to have a gain of 1 or a predetermined constant. Also, the filter 114 outputs the control input signal from the proportional controller 113.

Figure 3:
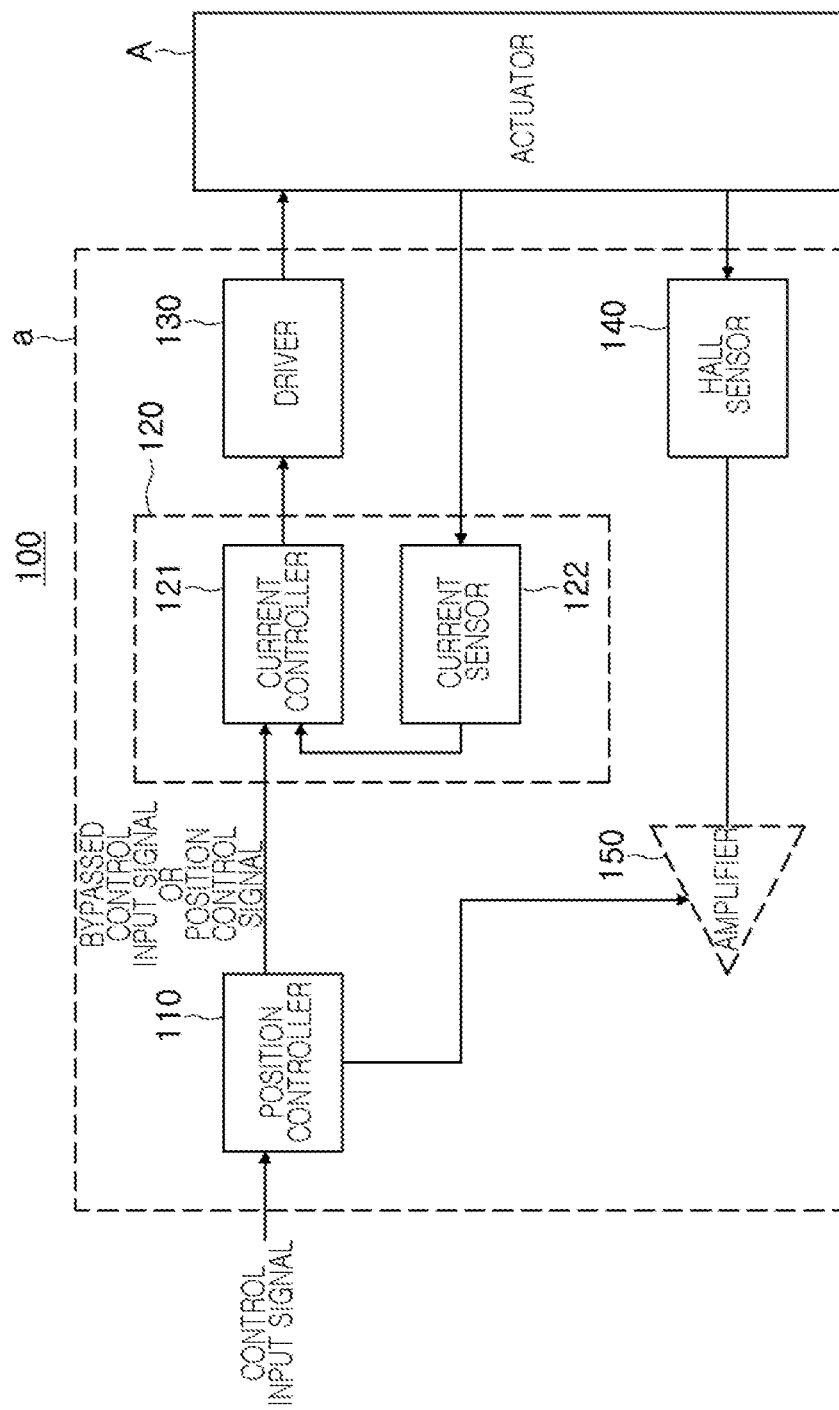
FIG. 3 is a schematic block diagram illustrating an operation of the actuator driving apparatus, according to the embodiment illustrated in FIG. 1.

FIG. 3 is a schematic block diagram illustrating an operation of the actuator driving apparatus, according to the embodiment illustrated in FIG. 1.

Referring to FIGS. 1 and 3, in response to the position controller 110 outputting the control input signal, the position controller 110 opens a feedback loop through which the detection signal is transferred from the hall sensor 140. For example, the position controller 110 sets the amplification rate of the amplifier 150 to zero. In addition, although not illustrated, the position controller may cut-off powder supplied to the amplifier 150 or open the signal transfer path to open the feedback loop. The feedback loop is defined by a signal transferred path from the actuator A, the hall sensor 140, and the amplifier 150 to the position controller 110.

FIGS. 4 through 8 are schematic block diagrams illustrating actuator driving apparatuses, according to further embodiments.

Figure 4:
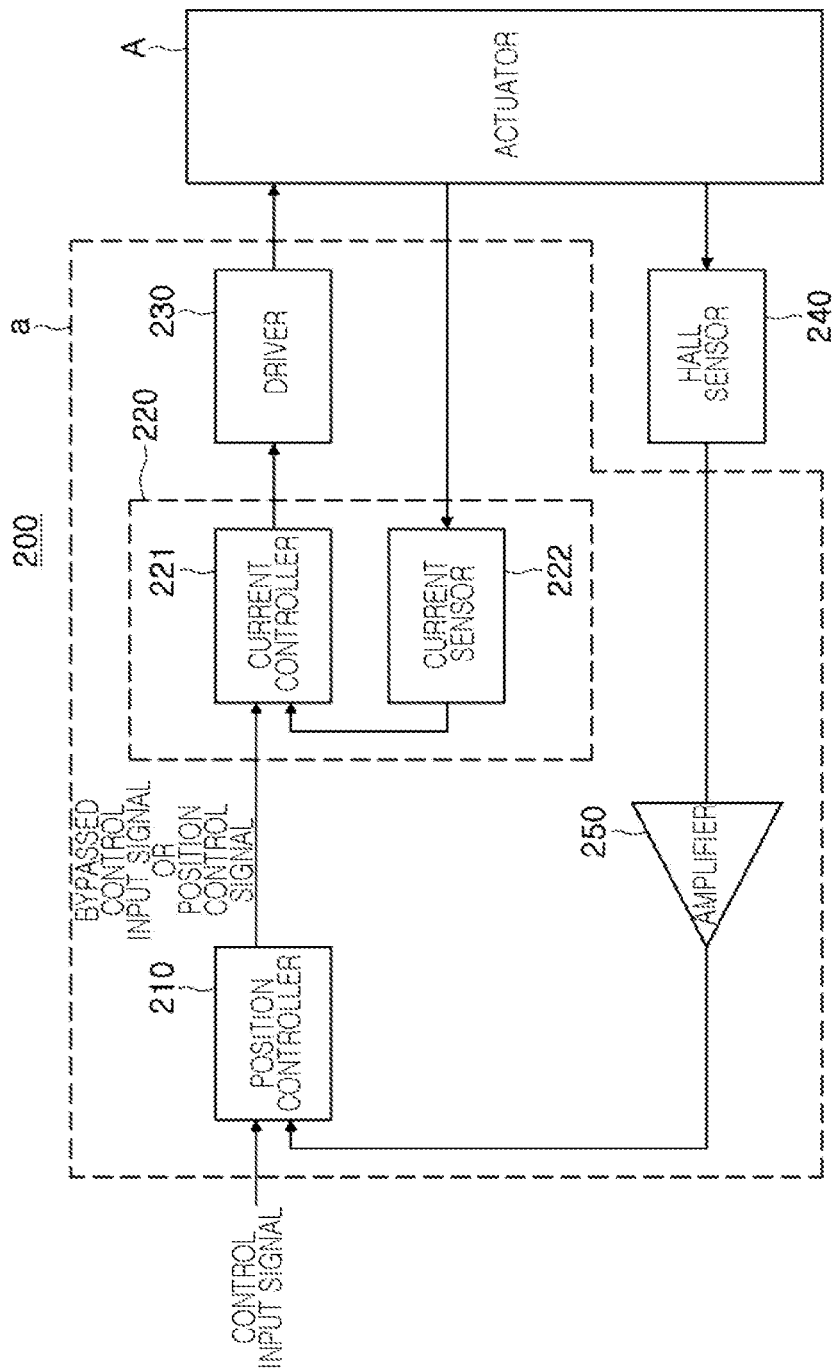
FIGS. 4 through 8 are schematic block diagrams illustrating actuator driving apparatuses, according to further embodiments, respectively.

Referring to FIG. 4, in an actuator driving apparatus 200, according to a further embodiment, a position controller 210, a current driver 220, a driver 230, and an amplifier are configured as a single integrated circuit as illustrated by a dotted line (a), and a hall sensor 240 is configured as a separate structural element or device external to the single integrated circuit, in contrast with the actuator driving apparatus 100 according to the embodiment in illustrated in FIG. 1. In accordance with a further embodiment, although the amplifier 250 and the driver 230 are illustrated in FIG. 4 as being part of the single integrated circuit of the actuator driving apparatus 200, a person skilled in the relevant art will appreciate that the amplifier 250 and the driver 230 may also be external to the single integrated circuit. Thus, the single integrated circuit would include the position controller 210 and the current driver 220. Further, the hall sensor 240 and the amplifier 250 may be external to the single integrated circuit, forming another single integrated circuit.

Because operations of the position controller 210, the current driver 220, the driver 230, the hall sensor 240, and the amplifier 250, except for the above-mentioned description associated with the configuration illustrated and described for FIG. 4, are the same as those in the actuator driving apparatus 100 of FIGS. 1 and 3, a detailed description thereof will be omitted.

Although first and second clock signals are not illustrated in FIG. 4, because descriptions of the first and second clock signals are the same or similar as those of FIG. 1 and this is equally applied to those in FIGS. 5 through 8, illustration and description thereof will be omitted.

Figure 5:
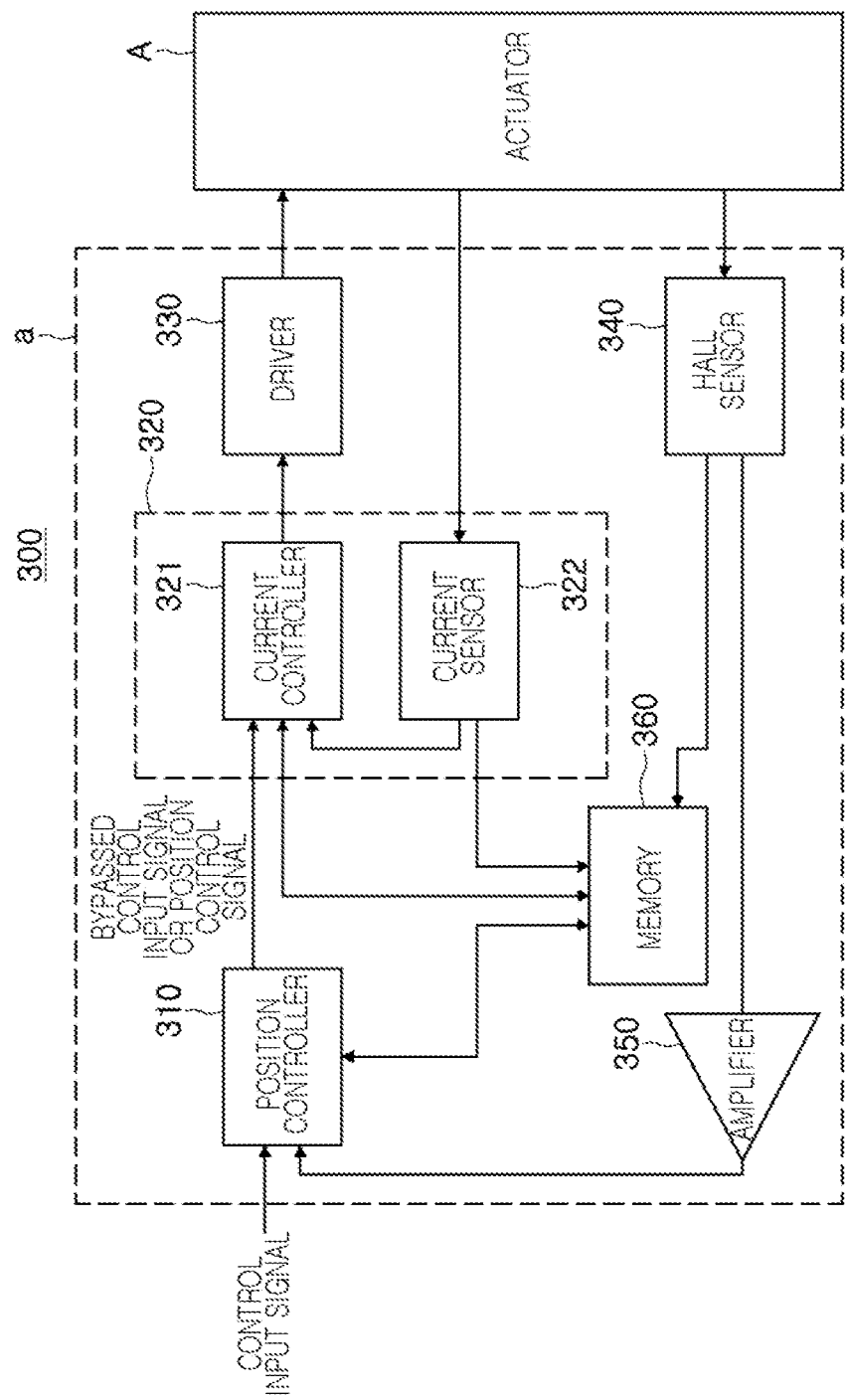

Referring to FIG. 5, an actuator driving apparatus 300, according to a further embodiment, also includes a memory 360 in addition to the configuration of the actuator driving apparatus 100 illustrated in FIG. 1.

The memory 360 is formed of a non-volatile memory, and the non-volatile memory may be a flash memory, an Electrically Erasable Programmable Read-Only Memory (EEPROM), or a Ferroelectric Random Access Memory (FeRAM). In order to increase an operating speed of the actuator driving apparatus 300, the FeRAM may be used. In this case, a read and write period may be several tens of microseconds (μs), and a delay may be decreased.

The memory 360 stores detection information included in a detection signal of a hall sensor 340 or a current sensor 322. In addition, the memory 360 stores information to drive an actuator A based on a control from a position controller 310 or a current controller 321, and provides the stored information to either the position controller 310 or the current controller 321.

Because operations of the position controller 310, a current driver 320, a driver 330, the hall sensor 340, and an amplifier 350, except for the above-mentioned description, are the same as those in the actuator driving apparatus 100 illustrated and described with respect to FIGS. 1 and 2, a detailed description thereof will be omitted.

Figure 6:
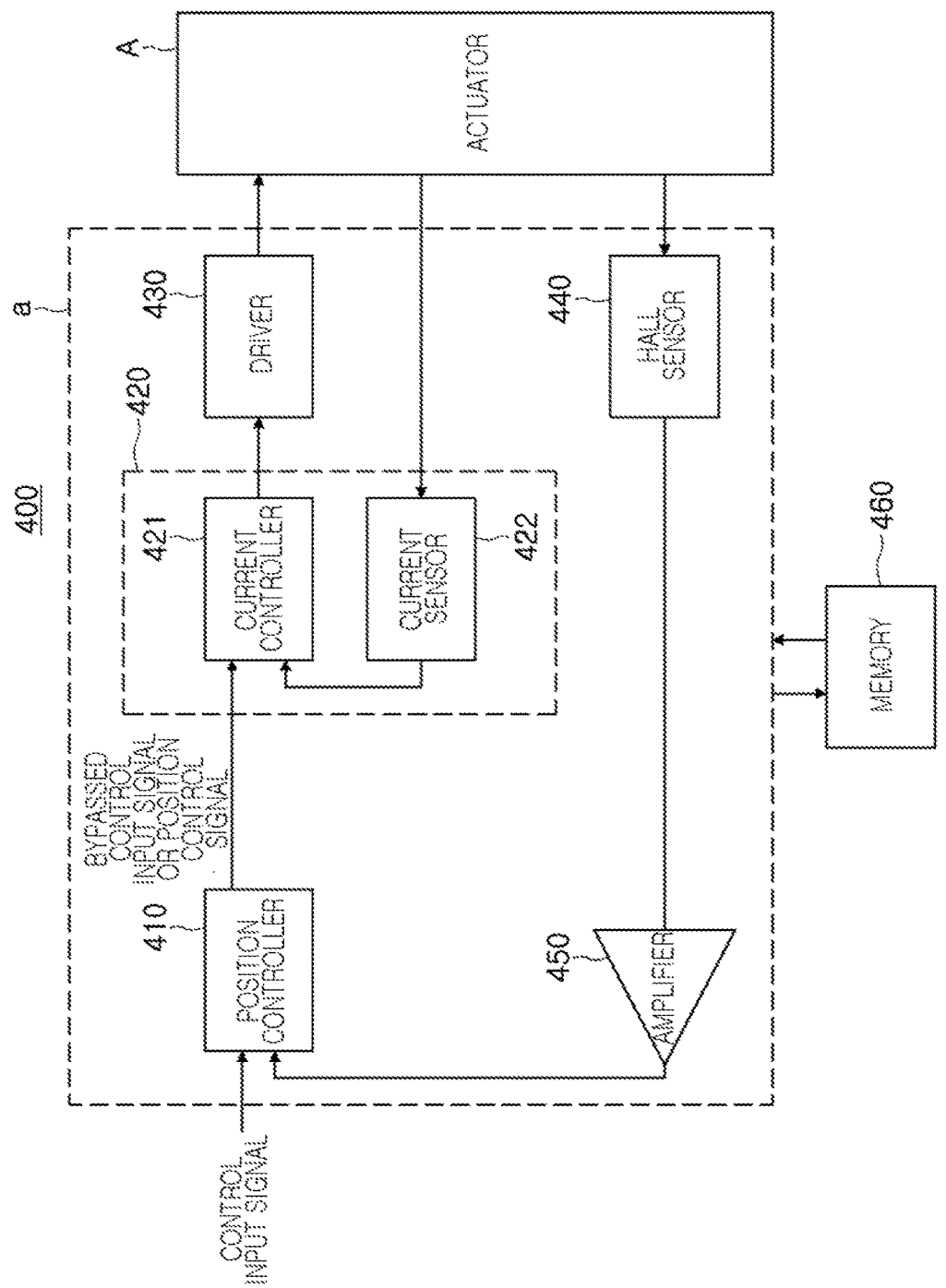

Referring to FIG. 6, in an actuator driving apparatus 400, according to a further embodiment, a memory 460 may be disposed external to an integrated circuit a.

Because structures and operations of a position controller 410, a current driver 420, a driver 430, a hall sensor 440, and an amplifier 450, except for the above-mentioned description, are the same as those in FIGS. 1, 3 and 5, a detailed description thereof will be omitted.

Figure 7:
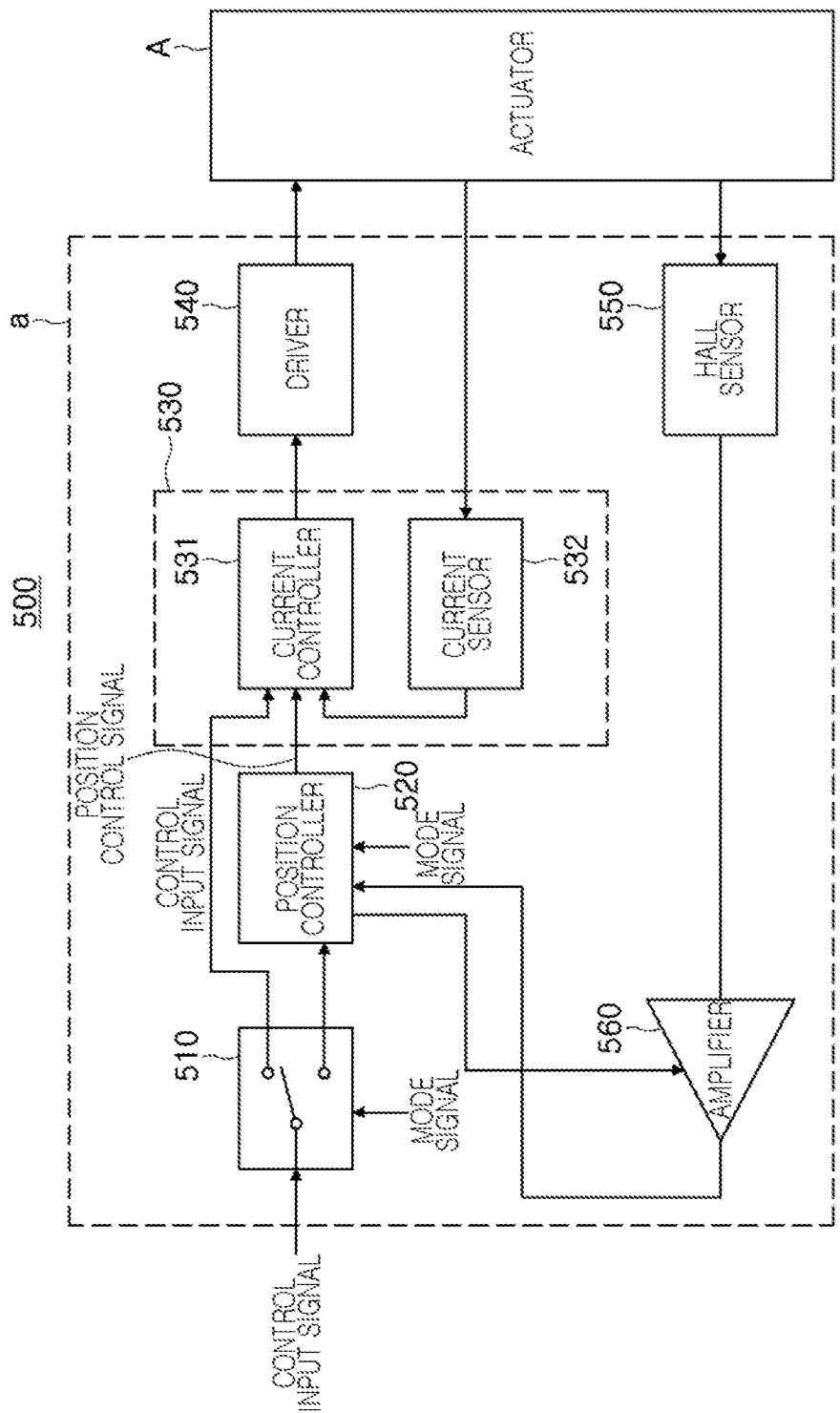

Referring to FIG. 7, an actuator driving apparatus 500, according to a further embodiment illustrated in FIG. 7 further includes a selection providing unit 510, compared to the actuator driving apparatus 100, according to the embodiment.

The selection providing unit 510 provides a control input signal to one of a position controller 520 and a current controller 531 according to a mode signal indicative of an operation mode.

In an example in which the operation mode is to provide the control input signal to the current controller 531, the position controller 520 sets an amplification rate of an amplifier 560 to zero to open a feedback loop through which a detection signal is transferred from a hall sensor 550. The feedback loop is defined by a signal transferred path from the actuator A, the hall sensor 550, and the amplifier 560 to the position controller 520.

Because operations of the position controller 520, a current driver 530, a driver 540, the hall sensor 550, and the amplifier 560, except for the above-mentioned description, are the same as those in the actuator driving apparatus 100 illustrated and described with respect to FIGS. 1 and 3, a detailed description thereof will be omitted.

Configurations and operation of the position controller 520 may be similar to those in FIG. 2B.

Figure 8:
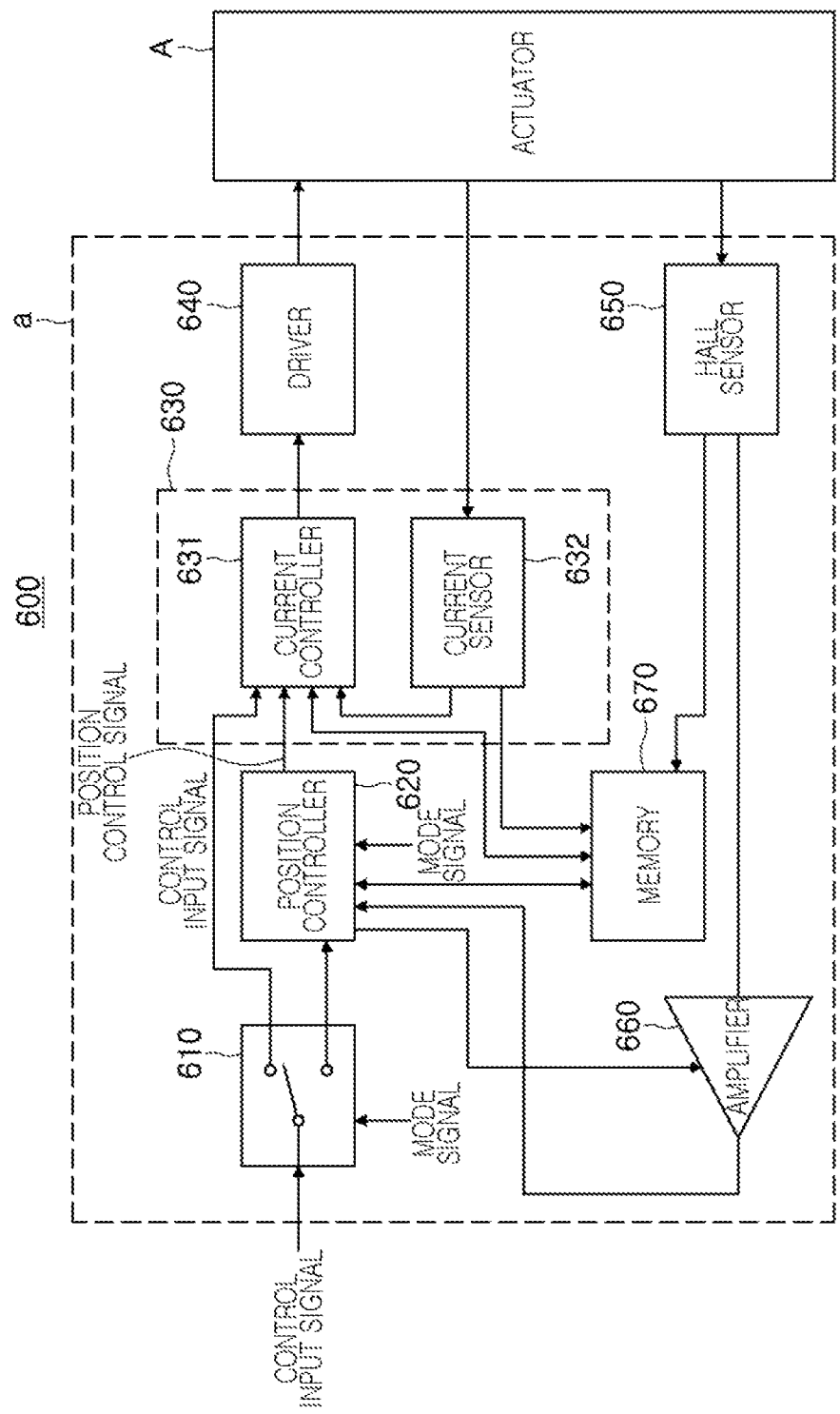

Referring to FIG. 8, an actuator driving apparatus 600, according to a further embodiment, also includes a memory 670 as included in the actuator driving apparatus 500 illustrated in FIG. 7.

The memory may be formed of a non-volatile memory similarly to the memory 360 in FIG. 5, where the non-volatile memory may be a FeRAM.

The memory 670 stores detection information included in a detection signal of a hall sensor 650 or a current sensor 632.

Descriptions of operations of a selection providing unit 610 and a position controller 620 may be the same as those in FIG. 7. That is, the selection providing unit 610 provides a control input signal to one of the position controller 510 and a current controller 631, according to a mode signal selecting an operation mode.

In an embodiment in which the mode signal directs the selection providing unit 610 to output the control input signal to the current controller 631, the position controller 620 sets an amplification rate of an amplifier 660 to zero to open a feedback loop (actuator A, the hall sensor 650, the memory 670, and the amplifier 660) through which the detection signal is transferred from the hall sensor 650.

Because operations of the position controller 620, a current driver 630, a driver 640, the hall sensor 650, and the amplifier 660, except for the above-mentioned description, are the same as those in the actuator driving apparatus 100 illustrated in FIGS. 1 and 3, a detailed description thereof will be omitted.

Figure 9:
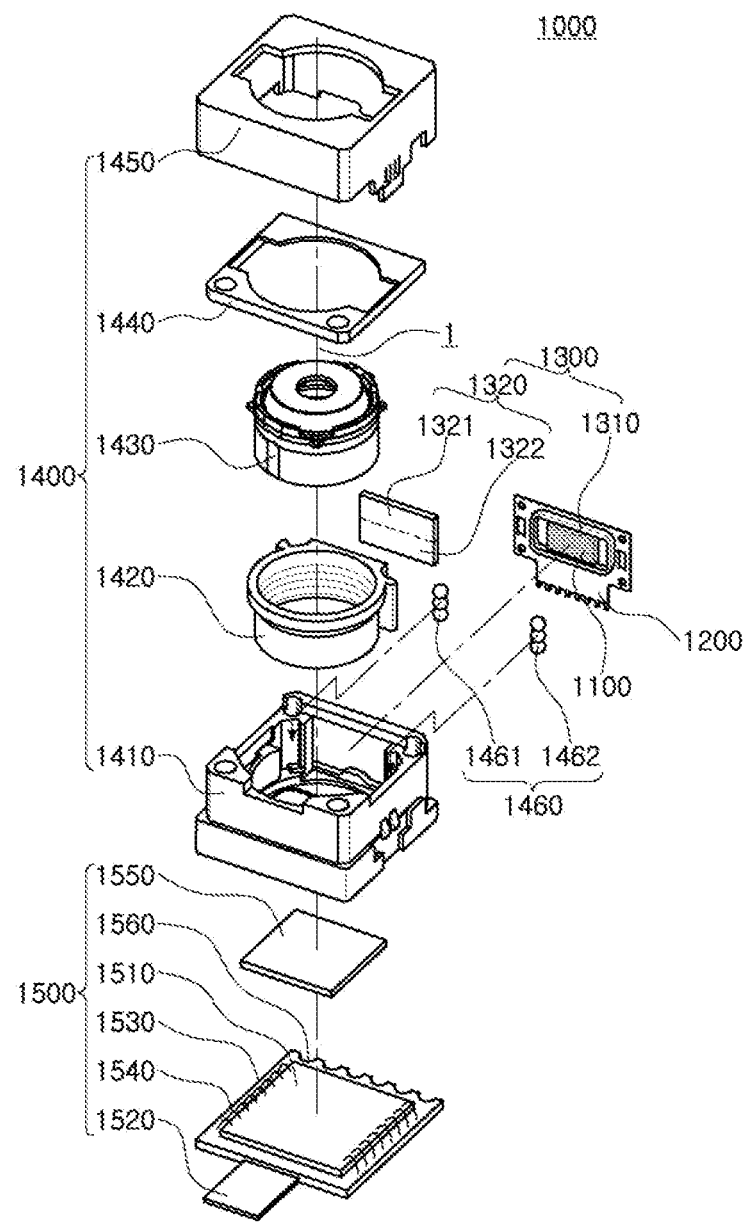
FIG. 9 is an exploded perspective diagram of a camera module, according to an embodiment.
Figure 10:
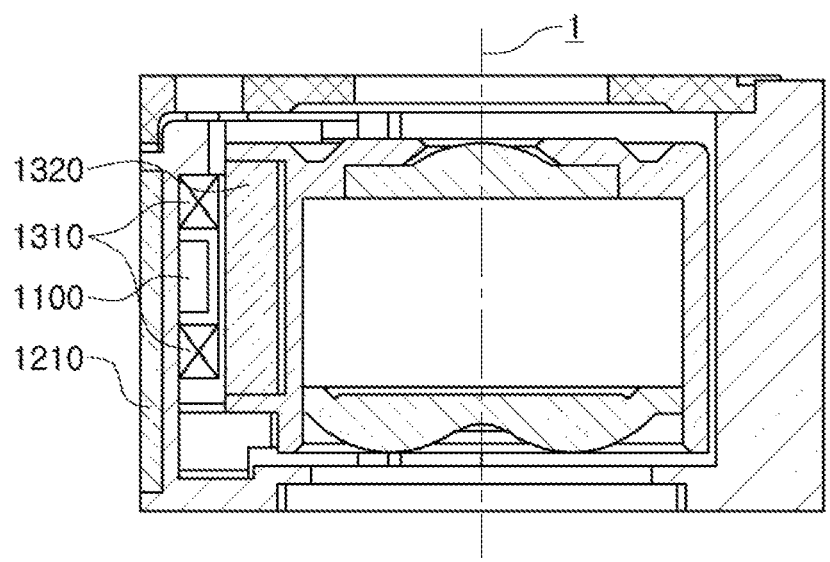
FIG. 10 is a cross-sectional diagram of the camera module, according to the embodiment illustrated in FIG. 9.

FIG. 9 is an exploded perspective view of a camera module, according to an embodiment, and FIG. 10 is a cross-sectional view of the camera module, according to the embodiment illustrated in FIG. 9.

Referring to FIG. 9, a camera module 1000, according to the embodiment, includes a lens module 1400.

The lens module 1400 includes a housing 1410 accommodating a lens carrier 1420 having a lens barrel 1430 therein, a stopper 1440 restricting movement of the lens carrier 1420 along an optical axis 1, and a shield case 1450 enclosing the housing 1410.

In the lens barrel 1430, at least one lens is attached by an adhesive method or a screw-coupling method.

An actuator driving apparatus 1100 is disposed on one surface of a board 1200, and an actuator 1300 includes a coil 1310 and a magnetic body 1320.

The coil 1310 is disposed on one surface of the board 1200, and the magnetic body 1320 is disposed on the lens carrier 1420 to face the coil 1310.

For example, the coil 1310 is disposed along a circumference of the actuator driving apparatus 1100.

The board 1200 on which the actuator driving apparatus 1100 and the coil 1310 are disposed may be a substrate or a printed circuit board, and disposed on a side surface of the housing 1410.

Because the actuator driving apparatus 1100 includes at least one of the configurations or embodiments described and illustrated with respect to FIGS. 1 through 8 and operate as described above, a detailed description thereof will be omitted.

A current from the actuator driving apparatus 1100 is supplied to the coil 1310 to form an electric field, which may interact with a magnetic field of the magnetic body 1320. The electric field interacting with the magnetic field generate a driving force moving the lens carrier 1420 in an optical axis (1) direction according to Fleming's left hand rule.

The magnetic body 1320 generates the driving force through interaction with the magnetic field generated when the current flows in the coil 1310, and provides position information to a hall sensor of the actuator driving apparatus 1100.

The magnetic body 1320 includes first and second magnetic bodies 1321 and 1322.

The first and second magnetic bodies 1321 and 1322 are formed by polarization of the magnetic body 1320 to easily control movement of the lens carrier 1420.

A ball bearing 1460 is disposed in an internal guide of the housing 1410 to support movement of the lens carrier 1420 along the optical axis, through a rolling motion.

The ball bearing 1460 is divided into ball bearings 1461 and 1462 to thereby be disposed in the internal guide of the housing 1410, and a lubricant may be disposed on surfaces of the ball bearings 1460. However, a person skilled in the relevant art will appreciate that the ball bearing 1460 may be either a single ball bearing 1460 or more than two ball bearings.

An image sensor module 1500 is disposed below the housing 1410 and includes an image sensor 1510, a flexible printed circuit 1520, and a circuit board 1530. The image sensor 1510 is disposed on an image formation surface and mounted on one surface of the circuit board 1530 through a wire bonding 1540. The flexible printed circuit 1520 extends from the circuit board 1530 to be connected to an internal circuit of an electronic apparatus, to be later described, such as a camera, a mobile communications terminal, or other similar electronic device. A coupling part 1560 coupled to the board 1200 is provided at one end portion of the circuit board 1530. In addition, the image sensor module 1500 also includes an IR filter 1550 filtering an incident image to transfer the filtered image to the image sensor 1510.

FIG. 10 illustrates a side cross-section view along an optical axis 1 of a yoke 1210 closely adhering the magnetic body 1320 and the actuator driving apparatus 1100 to each other is provided on the board 1200. The actuator driving apparatus 1100 is shown between the coil 1310. In addition, for example, the yoke 1210 may be replaced by using the shield case 1450 (FIG. 9) formed of a magnetic body.

Figure 11:
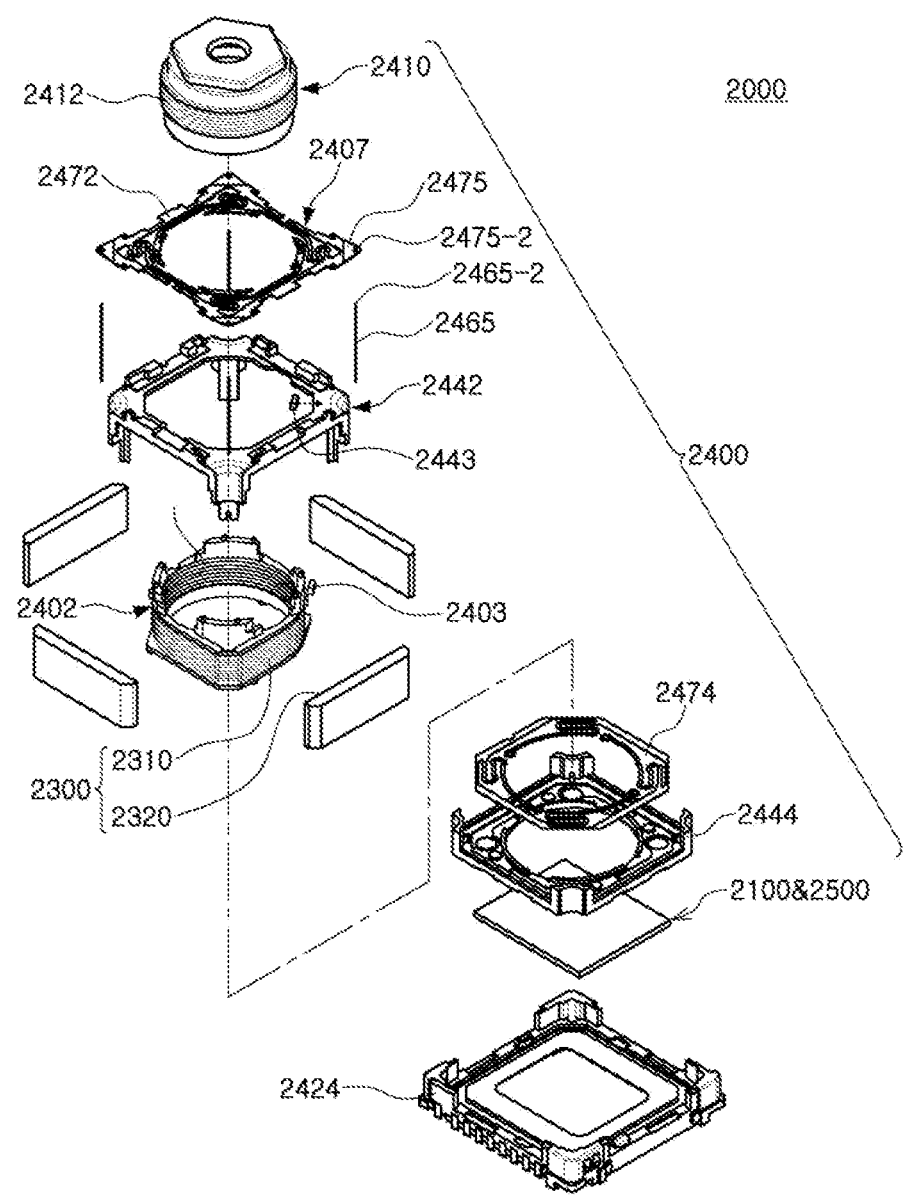
FIG. 11 is an exploded perspective diagram of a camera module, according to a further embodiment.

FIG. 11 is an exploded perspective diagram of a camera module, according to a further embodiment.

Referring to FIG. 11, a camera module 2000, according to a further embodiment, includes a lens module 2400, which includes a lens barrel 2410 with coils 2412, a lens carrier 2402, a housing 2424. In addition, although not illustrated, the lens module 2400 may include a shield case as illustrated in FIG. 9.

A coil 2310 is disposed on an outer peripheral surface of the lens carrier 2402. The coil 2310 is wound around the outer peripheral surface of the lens carrier 2402, and a plurality of wound coils are disposed along the outer peripheral surface of the lens carrier 2402. A plurality of magnetic bodies 2320 are disposed in accordance with disposition or arrangement of the coils 2310. For example, four magnetic bodies 2320 are disposed. The coil 2310 and the magnetic body 2320 form an actuator 2300, and a driving force capable of or sufficient to movie the lens carrier 2402 in an optical axis direction is generated by an interaction between an electric field of the coil 2310 and a magnetic field of the magnetic body 2320. The magnetic body 2320 is composed of first and second magnetic bodies as described in FIG. 9, and functions thereof may be similar to each other.

Furthermore, for example, at least one of the four magnetic bodies 2320 is used to provide position information to a hall sensor.

In addition, for example, a magnetic detection body 2403 may be disposed on the lens carrier 2402, for example, a portion of an outer surface of the lens carrier 2402 on which the coil 2310 is not formed.

Further, for example, a hall sensor 2443 detecting a magnetic field of the magnetic detection body 2403 is disposed on a first frame 2442. In addition, for example, the hall sensor 2443 may be the hall sensor 240 as illustrated in FIG. 4.

The lens module 2400 includes first and second frames 2442 and 2444, which are configured to support an exterior of the lens module 2400 and include first and second elastic members 2472 and 2474 supporting movement of the lens carrier in the optical axis direction. An image sensor module 2500 and an actuator driving apparatus 2100 are provided below the second frame 2444, and configured as a single integrated circuit.

A current from the actuator driving apparatus 2100 is transferred to the coil 2310 through a suspension wire 2465. To this end, an edge portion 2475 of the first elastic member 2472 includes a wire coupling part 2475-2 coupled to one end 2465-2 of the suspension wire 2465. The wire coupling part 2475-2 may have a hole shape.

Figure 12:
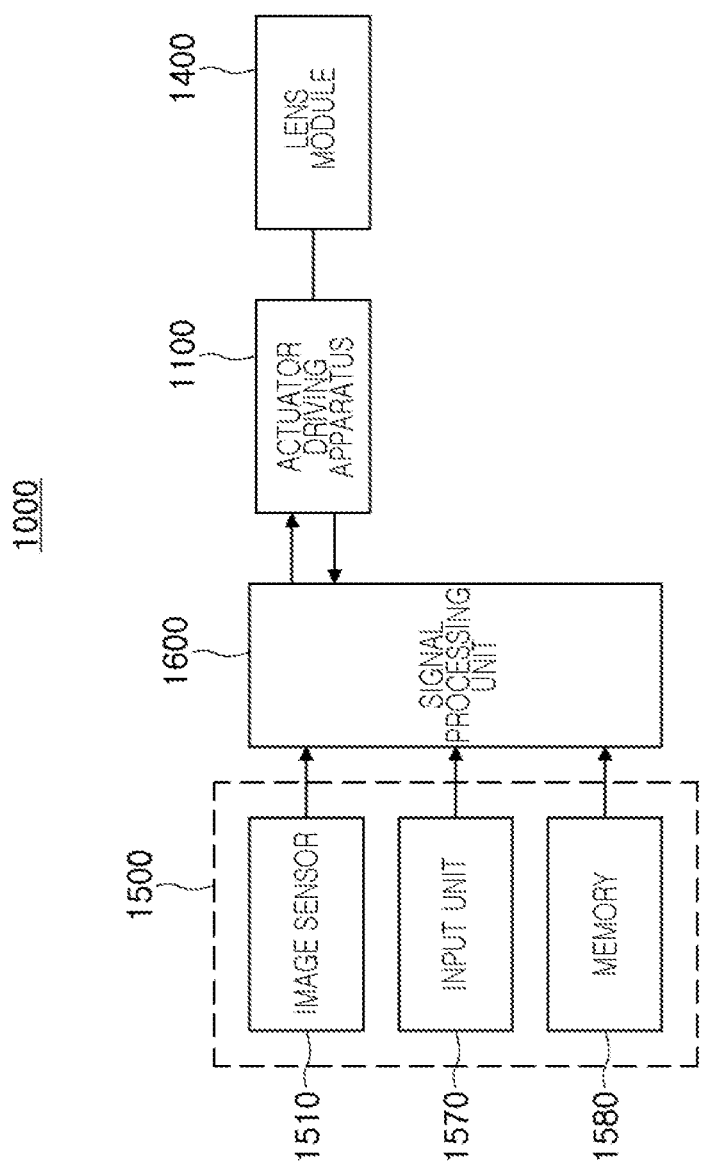
FIG. 12 is a schematic block diagram of the camera module, according to the embodiment.

FIG. 12 is a schematic block diagram of the camera module, according to an embodiment.

Referring to FIG. 12, the camera module 1000, according to an embodiment, also includes a signal processor or a signal processing unit 1600 configured to process an image signal incident through the lens module 1400 to be formed on the image sensor 1510 of the image sensor module 1500. The actuator driving apparatus 1100 performs an autofocusing operation by moving a lens carrier of the lens module 1400 along the optical axis direction according to a control input signal from the signal processing unit 1600.

In addition, an input unit 1570 receives a control signal from a user to reproduce an image of a subject, and the signal processing unit 1600 transmits the control signal as the control input signal to the actuator driving apparatus 1100 according to a process or algorithm stored in the memory 150, to control a position of the lens carrier of the lens module 1400.

Figure 13A:
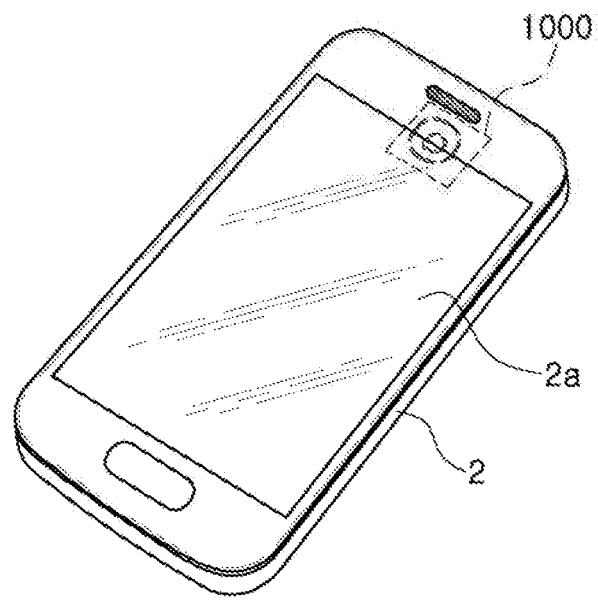
FIGS. 13A and 13B are schematic diagrams illustrating an exterior of an electronic apparatus, according to an embodiment.
Figure 13B:
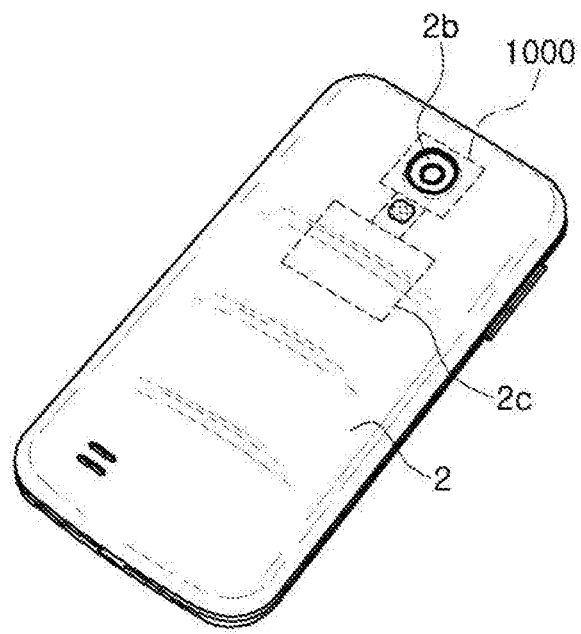

FIGS. 13A and 13B are schematic diagrams illustrating an exterior of an electronic apparatus, according to an embodiment.

An electronic apparatus 2, according to the embodiment, may be a camera, a mobile communications terminal, or other similar electronic device.

As illustrated in FIGS. 13A and 13B, the electronic apparatus 2, according to an embodiment, includes the camera module 1000, and the lens of the camera module 1000 is opened to the outside through an opening 2b of the electronic apparatus 2 to capture an image of an external subject.

The camera module 1000 is electrically connected to a control part 2C of the electronic apparatus 2 to perform a control operation depending on a user selection.

Figure 14:
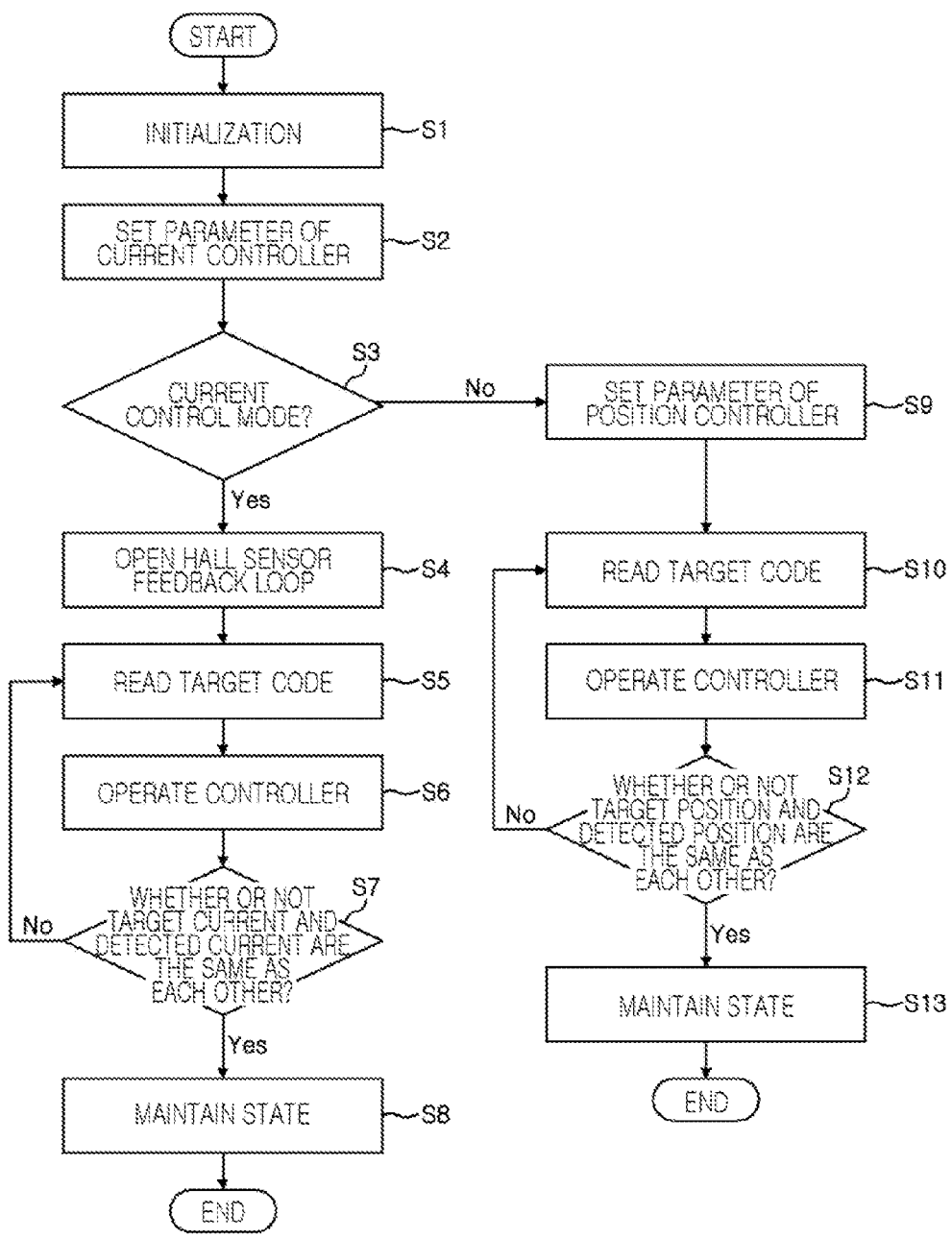
FIG. 14 is an operation flow chart illustrating a driving control method of the actuator, according to the embodiment in the present disclosure.

FIG. 14 is an operation flow chart illustrating a driving control method of the actuator, according to an embodiment.

Referring to FIG. 14 together with FIG. 1, in the driving control method of the actuator, according to the embodiment, at operation S1, the method initializes parameters set in the position controller 110 and the current controller 121 of the actuator driving apparatus 100, respectively.

At operation S2, the method sets the parameter of the current controller 121.

At operation S3, based on driving characteristics of the actuator A, the method determines whether a current control mode is to be performed or a position control mode is to be performed. The driving characteristics may be linearity or non-linearity characteristics of the actuator.

The current control mode may be a mode of outputting the control input signal to operate the current controller 121 without operating a main function of the position controller 110, and the position control mode may be a mode of operating main functions of the position controller 110 and the current controller 121.

In an embodiment in which the current control mode is selected, at operation S4, the feedback loop, through which the detection signal from the hall sensor 140 is sent to the position controller 110, is open, and the current controller 121 reads a target code included in the control input signal. At operation S5, the target code includes a target value to output the corresponding current. At operation S6, the current controller 121 is operated based on the target code.

At operation S7, the current controller 121 determines whether or not a target current corresponding to the target value and the detected current are equal to each other. If it is determined that the target current and the detected current are not equal, the method returns to operation S5. Operations S4 through S7 are performed until the target current and the detected current are equal.

If it is determined that the target current and the detected current are equal, at operation S8, the current controller maintains a state.

At operation S3, in response to the position control mode being selected, at operation S9, the parameter of the position controller 110 is set. At operation S10, the position controller 110 reads a target code included in the control input signal, where the target code includes a target value to provide the position control signal to the current controller 121. At operation S11, the current controller 121 drives the actuator A in order to move the lens carrier to the corresponding position.

At operation S12, the position controller 110 receives a feedback of the detection signal from the hall sensor 140 to determine whether or not the target position and the detected position are the same as each other. Operations S10 through S12 are repetitively or continuously performed until the target position and the detected position are equal. At operation S13, in response to the target position and the detected position being equal, the position controller 110 maintains a state.

FIGS. 15A through 16C are graphs illustrating features of the actuator driving apparatus, according to an embodiment.

Figure 15A:
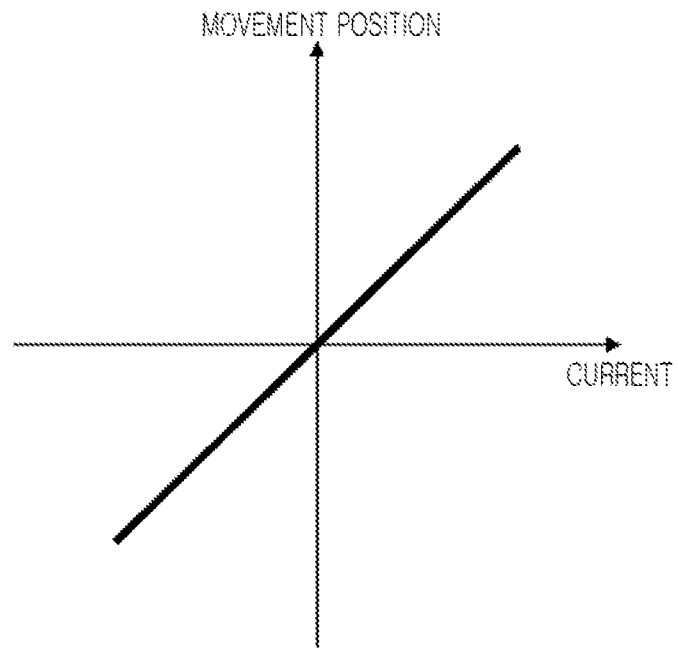
FIGS. 15A through 16C are graphs illustrating features of the actuator driving apparatus, according to the embodiment.

Referring to FIG. 15A, in an ideal case, in response to the current being input to the actuator, a position of the lens carrier is to linearly move.

Figure 15B:
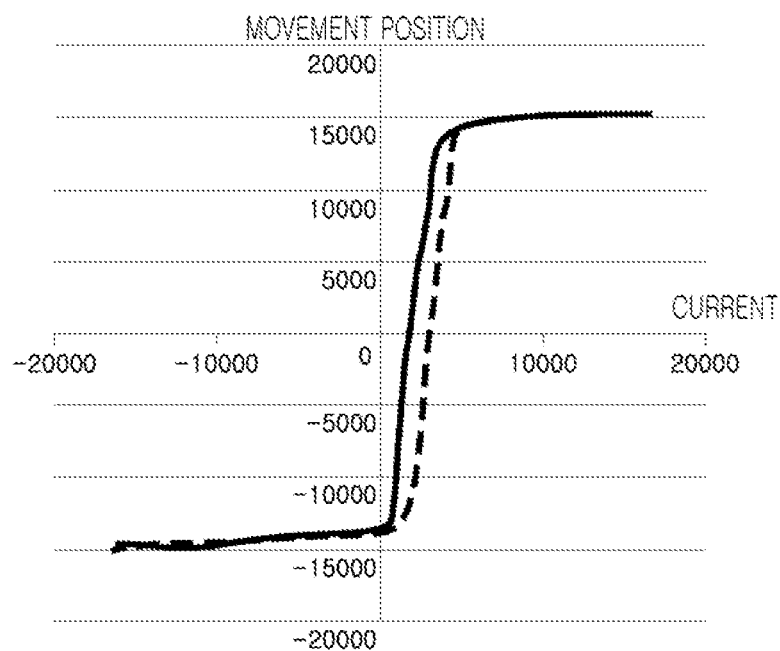

However, as illustrated in FIG. 15B, a section in which a movement position versus the input current is rapidly changed may be generated in a specific section depending on characteristics of the actuator. Therefore, it may be difficult to precisely control the position.

Figure 16A:
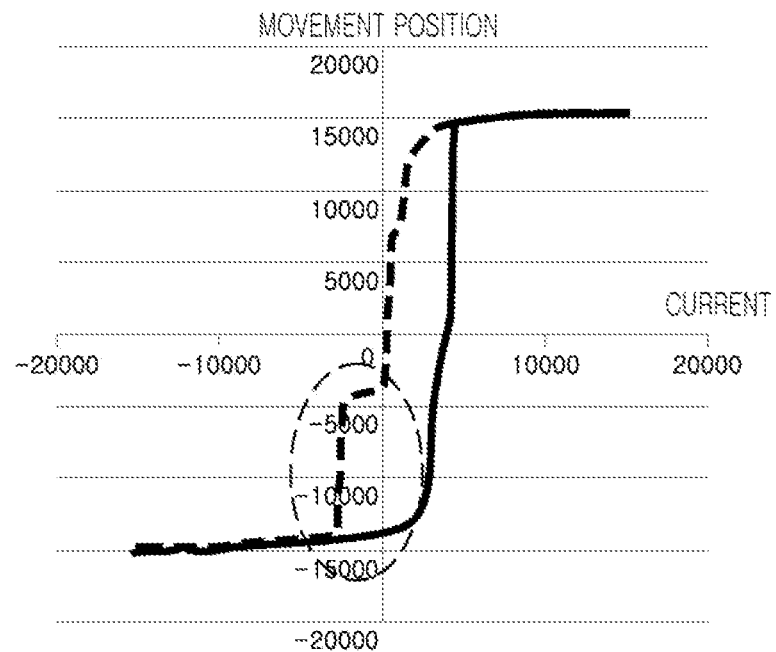

In addition, a section in which the movement position versus the input current has non-linearity characteristics may be generated as illustrated in a dotted oval of FIG. 16A.

Figure 16B:
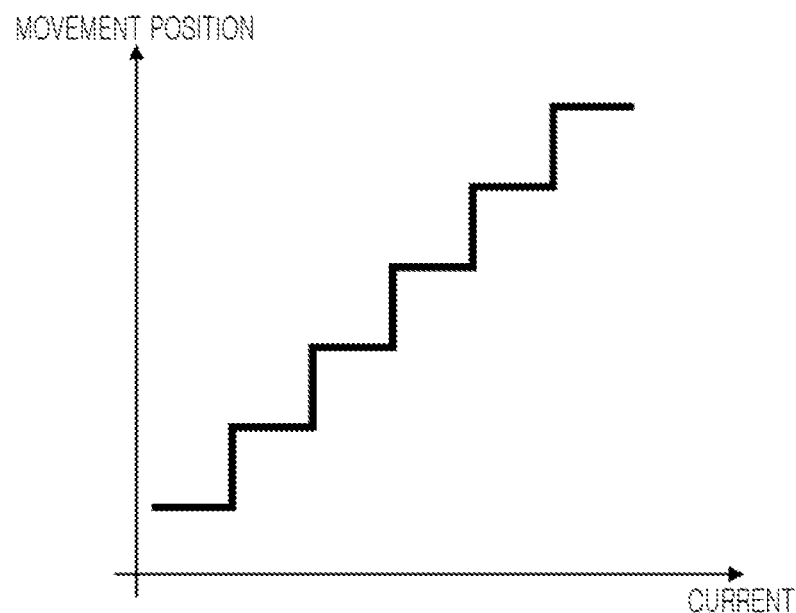
Figure 16C:
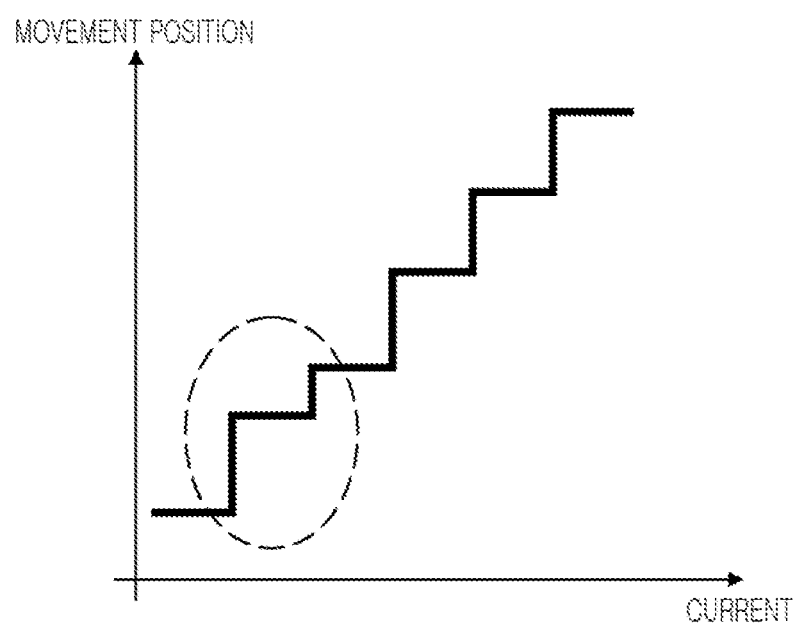

In an example, in the movement position versus the input current, ideally, non-linear sections and linear sections may be uniformly distributed as illustrated in FIG. 16B, but in some of the linear sections and the non-linear sections, the movement position versus the input current may rapidly change, unlike other linear sections and non-linear sections as illustrated in a dotted oval of FIG. 16C.

As set forth above, according various embodiments, linearity characteristics of an actuator are improved and the actuator is precisely controlled by selectively using a position and current control structural and functional embodiment or a current control structural and functional embodiment depending on driving characteristics of the actuator or the lens barrel.

The drivers, units, driver integrated circuits, apparatuses, controllers, elements, modules, devices, and other components illustrated in FIGS. 1-8 that perform the operations described herein with respect to FIG. 14 are implemented by hardware components. Examples of hardware components include controllers, sensors, generators, drivers, and any other electronic components known to one of ordinary skill in the art. In one example, the hardware components are implemented by one or more processors or computers, a central processing unit (CPU), a microprocessor, an application specific integrated circuit (ASIC), field programmable gate arrays (FPGA), and the like, and may have a plurality of cores. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIG. 14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 14 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator driving apparatus, comprising:
   a position controller configured to receive a control input signal and selectively output either one of the control input signal and a position control signal generated based on the control input signal; and
   a current driver configured to generate a current to drive an actuator according to the selectively output one of the control input signal and the position control signal.

2. The actuator driving apparatus of claim 1, wherein the position controller comprises:
   a switch configured to convert a signal transfer path of the control input signal according to a mode signal;
   a position error calculator calculating an error between the control input signal transferred from the switch and a detection signal;
   a proportional-integral-derivative (PID) controller configured to perform proportional, integral, or derivative control on the error and output a control result indicative thereof; and
   a filter configured to filter the control result.

3. The actuator driving apparatus of claim 1, wherein the position controller comprises:
   a position error calculator configured to turn-off an operation to output the control input signal or calculate a position error between the control input signal and a detection signal according to a mode signal;
   a proportional-integral-derivative (PID) controller configured to perform proportional, integral, or derivative control on the position error, turn derivative and integral control operations off according to the mode signal, and set a gain of the proportional control to output the control input signal from the position error calculator; and
   a filter configured to filter a control result from the PID controller or output the control input signal from the PID controller.

4. The actuator driving apparatus of claim 1, wherein the current driver comprises:
   a current controller configured to output the current to drive the actuator according to the selectively output one of the control input signal and the position control signal; and
   a current sensor configured to detect the current output to the actuator.

5. The actuator driving apparatus of claim 1, further comprising:
   a driver configured to receive the current from the current driver to drive the actuator.

6. The actuator driving apparatus of claim 1, further comprising:
   a hall sensor configured to detect a position of the actuator; and
   an amplifier configured to amplify a level of a detection signal from the hall sensor.

7. The actuator driving apparatus of claim 6, wherein in response to the position controller outputting the control input signal, the position controller opens a feedback loop through which the detection signal is transferred from the hall sensor, or sets an amplification rate of the amplifier to zero.

8. The actuator driving apparatus of claim 1, wherein the position controller operates according to a first clock signal, and
   the current driver operates according to a second clock signal having a different clock period to a clock period of the first clock signal.

9. The actuator driving apparatus of claim 8, wherein the second clock signal has a sampling rate higher than a sampling rate of the first clock signal.

10. A camera module, comprising:
    an actuator configured to move a lens carrier; and
    an actuator driving apparatus comprising:
        a position controller configured to receive a control input signal and selectively output either one of the control input signal and a position control signal generated based on the control input signal, and a current driver configured to generate a current to drive the actuator according to the selectively output one of the control input signal and the position control signal.

11. The camera module of claim 10, wherein the actuator driving apparatus further comprises:
a driver configured to receive the current from the current driver to drive the actuator;
a hall sensor configured to detect a position of the actuator; and
an amplifier configured to amplify a level of a detection signal from the hall sensor.

12. The camera module of claim 10, wherein the actuator driving apparatus comprises:
a position controller configured to generate the position control signal based on the control input signal;
a current driver configured to output the current driving the actuator according to the position control signal from the position controller or the control input signal;
a selection providing unit configured to transfer the control input signal to the position controller or the current driver according to a mode signal;
a driver configured to receive the current from the current driver to drive the actuator;
a hall sensor configured to detect a position of the actuator; and
an amplifier configured to amplify a level of a detection signal from the hall sensor.

13. The camera module of claim 11, wherein the position controller comprises:
a switch configured to convert a signal transfer path of the control input signal according to the mode signal;
a position error calculator configured to calculate an error between the control input signal transferred from the switch and a detection signal;
a proportional-integral-derivative (PID) controller configured to perform proportional, integral, or derivative control on the error and output a control result indicative thereof; and
a filter configured to filter the control result.

14. The camera module of claim 11, wherein the position controller comprises:
a position error calculator configured to turn-off an operation to output the control input signal or calculate a position error between the control input signal and a detection signal according to a mode signal;
a proportional-integral-derivative (PID) controller configured to perform proportional, integral, or derivative controlling on information calculated by the position error calculator, turn derivative and integral control operations off according to the mode signal, and set a gain of the proportional control to output the control input signal output from the position error calculator; and
a filter configured to filter a control result from the PID controller or output the control input signal from the PID controller.

15. The camera module of claim 12, wherein the position controller comprises:
a position error calculator configured to calculate an error between the transferred control input signal and a detection signal;
a proportional-integral-derivative (PID) controller configured to perform proportional, integral, or derivative control on the error and output a control result indicative thereof; and
a filter configured to filter the control result.

16. The camera module of claim 10, wherein the actuator comprises:
a coil configured to generate a magnetic field depending on the current; and
a magnetic body configured to interact with the magnetic field of the coil to generate driving force moving the lens carrier.

17. The camera module of claim 16, further comprising:
a magnetic detection body configured to detect an intensity of the magnetic field,
wherein the magnetic detection body comprises first and second magnetic bodies, which are polarized.

18. The camera module of claim 10, further comprising:
a board on which the actuator driving apparatus is mounted,
wherein the actuator comprises:
a coil disposed on the board to generate a magnetic field based on the current; and
a magnetic body disposed to face the coil and configured to interact with the current of the coil to generate a driving force to move the lens carrier.

19. The camera module of claim 18, further comprising:
a ball bearing configured to support movement of the lens carrier,
wherein a lubricant is applied to a surface of the ball bearing.

20. The camera module of claim 16, wherein the actuator further comprises a yoke closely connecting the first magnetic body and the actuator driving apparatus to each other.

21. The camera module of claim 16, wherein the coil is disposed outside of the lens carrier, and
magnetic bodies are disposed in accordance with a disposition of the coil.

22. The camera module of claim 20, further comprising:
an elastic member configured to be disposed on at least one of upper and lower portions of the lens carrier to support movement of the lens carrier.

23. The camera module of claim 10, wherein the lens carrier comprises a lens barrel having at least one lens attached by one of an adhesive method and a screw-coupling method.

24. The camera module of claim 10, further comprising:
an image sensor module configured to process an image signal captured through a lens of the lens carrier.

25. An electronic apparatus, comprising:
a camera module configured to process an image signal captured through a lens, and comprising an actuator configured to move a lens carrier, and an actuator driving apparatus comprising
a position controller configured to receive a control input signal and selectively output either one of the control input signal and a position control signal generated based on the control input signal, and
a current driver configured to drive the actuator by generating a current according to the selectively output one of the control input signal and the position control signal; and
a display part configured to display the image captured by the camera module.

26. The electronic apparatus of claim 25, wherein the actuator driving apparatus further comprises:
a driver configured to receive the current from the current driver to drive the actuator;
a hall sensor configured to detect a position of the actuator; and
an amplifier configured to amplify a level of a detection signal from the hall sensor.

27. The electronic apparatus of claim 25, wherein the actuator driving apparatus comprises:
- a position controller configured to generate the position control signal based on the control input signal;
- a current driver configured to output the current driving the actuator according to the position control signal or the control input signal;
- a selection providing unit configured to transfer the control input signal to the position controller or the current driver according to a mode signal;
- a driver configured to receive the current from the current driver to drive the actuator;
- a hall sensor configured to detect a position of the actuator; and
- an amplifier configured to amplify a level of a detection signal from the hall sensor.

28. The electronic apparatus of claim 26, wherein the position controller comprises:
- a switch configured to convert a signal transfer path of the control input signal according to the mode signal;
- a position error calculator configured to calculate an error between the control input signal transferred from the switch and a detection signal;
- a proportional-integral-derivative (PID) controller configured to perform proportional, integral, or derivative control on the error and output a control result indicative thereof; and
- a filter configured to filter the control result.

29. The electronic apparatus of claim 26, wherein the position controller comprises:
- a position error calculator turning off an operation to output the control input signal or calculating a position error between the control input signal and a detection signal according to a mode signal;
- a proportional-integral-derivative (PID) controller performing proportional, integral, or derivative controlling on information calculated by the position error calculator, turning derivative and integral control operations off according to the mode signal, and setting a gain of the proportional control to output the control input signal output from the position error calculator; and
- a filter configured to filter a control result from the PID controller or output the control input signal from the PID controller.

30. The electronic apparatus of claim 27, wherein the position controller comprises:
- a position error calculator configured to calculate an error between the transferred control input signal and a detection signal;
- a proportional-integral-derivative (PID) controller configured to perform proportional, integral, or derivative control on the error and output a control result indicative thereof; and
- a filter configured to filter the control result.

31. An actuator driving apparatus, comprising:
- a position controller configured to receive a control input signal and selectively operate in either one of current control mode, in which the position controller outputs the control input signal, and a position control mode, in which the position controller generates a position control signal based on the input control signal;
- a current controller configured to generate a current to drive an actuator based on the control input signal or based on the position control signal; and
- a sensor configured to, in the position control mode, detect a position of the actuator, generate a detection signal indicative of the position of the actuator, and transmit the detection signal to the position controller,
- wherein the position controller is configured to calculate an error between position information included in the control input signal and position information included in the detection signal, and configured to process the control input signal based on the error to control the position of the actuator.

32. The actuator driving apparatus of claim 31, further comprising:
- a current sensor configured to convert the current generated to drive the actuator into a voltage and feedback the voltage to the current controller.

33. The actuator driving apparatus of claim 31, further comprising:
- an amplifier configured to amplify the detection signal, wherein the position controller controls an amplification rate of the amplifier.

34. The actuator driving apparatus of claim 31, wherein the position controller processes the control input signal through a proportional, integral, or derivative control on the control input signal based on the error to generate position control information.

35. The actuator driving apparatus of claim 31, wherein the position controller operates according to a first clock signal, and the current controller operates according to a second clock signal, and an operation interval of the second clock signal is different from an operation interval of the first clock signal.

36. The actuator driving apparatus of claim 31, wherein the position controller comprises a switch to select a signal transfer path based on the current control mode or the position control mode.

37. The actuator driving apparatus of claim 31, wherein the position controller comprises a proportional, integral, and derivative (PID) controller to select the signal transfer path and process the control input signal through a proportional, integral, or derivative control on the control input signal based on the error to generate position control information.

38. The actuator driving apparatus of claim 31, further comprising:
- a memory configured to store detection information included in a detection signal of the sensor, store information to drive the actuator based on a control from the position controller or the current controller, and provide the stored information to either the position controller or the current controller.

39. A method to drive an actuator driving apparatus, comprising:
- receiving a control input signal to selectively operate in either one of a current control mode, in which the control input signal is output to control driving of an actuator, and a position control mode, in which a position control signal is generated based on the control input signal to control driving of the actuator;
- generating a current to drive the actuator based on the control input signal in the current control mode or based on the position control signal in the position control mode;
- in the position control mode,
- detecting a position of the actuator;
- generating a detection signal indicative of the position of the actuator;
- transmitting the detection signal to the position controller;

calculating an error between position information included in the control input signal and position information included in the detection signal; and processing the control input signal based on the error to control the position of the actuator.

40. The method of claim 39, further comprising:

converting the current transferred to the actuator into a voltage; and feedback the voltage to the current controller.

41. The method of claim 39, further comprising:

amplifying the detection signal at a controlled amplification rate.

42. The method of claim 39, wherein the control input signal is processed through a proportional, integral, or derivative control on the control input signal based on the error to generate position control information.

43. The method of claim 39, further comprising:

storing detection information included in a detection signal of the sensor;

storing information to drive the actuator based on a control from the position controller or the current controller; and providing the stored information to either the position controller or the current controller.

* * * * *